United States Patent
Liu et al.

(10) Patent No.: US 11,115,955 B2
(45) Date of Patent: Sep. 7, 2021

(54) METHOD FOR TRANSMITTING PAGING MESSAGE, DEVICE, AND STORAGE MEDIUM

(71) Applicant: ZTE CORPORATION, Guangdong (CN)

(72) Inventors: Zhuang Liu, Shenzhen (CN); Yin Gao, Shenzhen (CN); He Huang, Shenzhen (CN); Wenting Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/714,114

(22) Filed: Dec. 13, 2019

(65) Prior Publication Data

US 2020/0120638 A1 Apr. 16, 2020

Related U.S. Application Data

(63) Continuation of application No. PCT/CN2018/089075, filed on May 30, 2018.

(30) Foreign Application Priority Data

Jun. 15, 2017 (CN) .......................... 201710451466.7

(51) Int. Cl.
| | |
|---|---|
| H04W 68/02 | (2009.01) |
| H04W 76/28 | (2018.01) |
| H04W 52/02 | (2009.01) |
| H04W 68/08 | (2009.01) |
| H04W 68/00 | (2009.01) |

(52) U.S. Cl.
CPC ....... *H04W 68/02* (2013.01); *H04W 52/0216* (2013.01); *H04W 68/005* (2013.01); *H04W 68/08* (2013.01); *H04W 76/28* (2018.02)

(58) Field of Classification Search
CPC ... H04W 68/02; H04W 68/005; H04W 68/08; H04W 76/28; H04W 52/0216
USPC ......................................................... 455/458
See application file for complete search history.

(56) References Cited

U.S. PATENT DOCUMENTS

| | | | | |
|---|---|---|---|---|
| 2011/0256883 A1* | 10/2011 | Park | ...................... | H04W 68/02 |
| | | | | 455/456.1 |
| 2013/0182677 A1* | 7/2013 | Frenger | ............... | H04W 68/005 |
| | | | | 370/329 |
| 2018/0098297 A1* | 4/2018 | Yu | ...................... | H04W 68/005 |

(Continued)

FOREIGN PATENT DOCUMENTS

| | | |
|---|---|---|
| CN | 102655658 A | 9/2012 |
| CN | 103109573 A | 5/2013 |
| CN | 103200680 A | 7/2013 |

(Continued)

OTHER PUBLICATIONS

3GPP TSG RAN WG3 Meeting #96 R3-171456 (Year: 2017).*

(Continued)

*Primary Examiner* — William Nealon
(74) *Attorney, Agent, or Firm* — Foley & Lardner LLP

(57) ABSTRACT

Provided are a method and device for transmitting a paging message, and a storage medium. The method includes: generating a paging message, and transmitting the paging message to a distributed network unit (DU), where the paging message includes assistance information, and the assistance information is used for instructing the DU to transmit the paging message.

16 Claims, 5 Drawing Sheets

(56) References Cited

U.S. PATENT DOCUMENTS

2018/0302878 A1* 10/2018 Byun ............... H04W 68/02
2018/0324752 A1* 11/2018 Kim ............... H04W 68/005

FOREIGN PATENT DOCUMENTS

| CN | 103826234 A | 5/2014 |
|---|---|---|
| CN | 104883706 A | 9/2015 |
| CN | 106304336 A | 1/2017 |
| EP | 2 536 230 B1 | 4/2015 |
| JP | 02-276322 A | 11/1990 |
| JP | 07-059136 A | 3/1995 |
| WO | WO-2016/186416 A1 | 11/2016 |

OTHER PUBLICATIONS

3GPP TSG RAN WG3 Meeting #96 R3-171538 (Year: 2017).*
3GPP TSG RAN WG3 Meeting #96 R3-171841 (Year: 2017).*
3GPP TSG RAN WG3 Meeting #95bis R3-171220 (Year: 2017).*
3GPP TSG RAN WG3 Meeting #96 R3-171460 (Year: 2017).*
EMF—5G Explained—How 5G Works, (www.emfexplained.info) (Year: 2019).*
3GPP TSG RAN WG3 Meeting #96 R3-171842 (Year: 2017).*
CATT: "Stage 3 TP for RRC message transfer in F1 interface", 3GPP TSG-RAN WG3 Meeting #96; R3-171460, Hangzhou, May 4, 2017 (9 pages).
Extended European Search Report on EP 18817072.4 dated Apr. 14, 2020 (16 pages).
Huawei: "Considerations on the control plane functions located in DU", 3GPP TSG-RAN3 Meeting #95; R3-171220 Spokane, Apr. 3, 2017 (3 pages).
Huawei: "TP on Paging message delivery over F1 to 38.473", 3GPP TSG-RAN3 Meeting #96; R3-171842, Hangzhou, May 14, 2017 (3 pages).
Samsung: "RRC messages over FI interface", 3GPP TSG-RAN WG3 Meeting #96; R-171633, Hangzhou, May 14, 2017 (3 pages).
International Search Report and Written Opinion for International Appl. No. PCT/CN2018/089075, dated Aug. 24, 2018.
First Office Action for JP Appl. No. 2019568683, dated Feb. 12, 2021 (with English translation, 9 pages).
First Office Action for CN Appl. No. 201710451466.7 dated Mar. 10, 2021 (with English translation, ).

* cited by examiner

METHOD FOR TRANSMITTING PAGING MESSAGE, DEVICE, AND STORAGE MEDIUM

CROSS-REFERENCE TO RELATED APPLICATIONS

This application claims the benefit of priority under 35 U.S.C. § 120 as a continuation of PCT Patent Application No. PCT/CN2018/089075 filed on May 30, 2018, which claims priority to Chinese Patent Application No. 201710451466.7 filed on Jun. 15, 2017, the disclosure of each of which is incorporated herein by reference in its entirety.

TECHNICAL FIELD

The present disclosure relates to, but is not limited to, the field of communications.

BACKGROUND

The 5G network architecture has innovation and networking flexibility. As shown in FIG. 1, a base station at a wireless access network side in the 5G network is separated into two functional entities, i.e., a centralized unit (CU) and a distributed unit (DU). In the network architecture in which the CU and DU are separated, a network function insensitive to the latency is placed in the CU, and a network function sensitive to the latency is placed in the DU. The CU and the DU perform transmission and connection through an ideal or non-ideal fronthaul interface. In addition, the separation of CU and DU may also be suitable for future evolution of the 4G.

A user Equipment (UE) receives paging information in a discontinuous reception (DRX) manner to save power consumption. The location of the paging information appearing in an air interface is fixed, and is represented by a paging frame (PF) and a paging occasion (PO). One PF is a radio frame, and may include one or more POs. The PO is one sub-frame in the paging frame, includes information of a paging radio network temporary identity (P-RNTI), and is transmitted on a physical downlink control channel (PDCCH). The P-RNTI is defined as a fixed value in a protocol. The UE will read the paging message from a physical downlink shared channel (PDSCH) according to the P-RNTI. A frame number of the PF and a subframe number the PO may be calculated by an international mobile subscriber identification number (IMSI) of the UE, a DRX cycle, and the number of POs in the DRX cycle. A paging mechanism is shown in FIG. 2.

For an integrated base station, in a paging process initiated by a core network, the core network first transmits a paging message to the base station; and in a paging process initiated by the base station, the base station may construct a paging message. The base station needs to calculate a transmission time point of the paging message in the air interface, and the base station transmits the paging message at the calculated transmission time point to page a designated terminal. However, after the base station is separated into the CU and the DU, there is no specific method to solve problems of how the DU and the CU cooperatively transmit the paging message, and of which network elements are specifically used to calculate the air interface transmission time point of the paging message. Therefore, it is urgently needed to solve the problem of how to page the designated terminal when the CU and the DU are separated.

In addition, since there is a fronthaul between the CU and the DU, in the case of non-ideal fronthaul, a large transmission latency may exist between the CU and the DU, so when the CU transmits the paging message, the transmission latency between the CU and the DU needs to be considered, and the paging message needs to be transmitted to the DU in advance, so as to avoid missing the air interface transmission time point of the paging message due to the transmission latency.

It can be learned from the above that the problem that the paging message cannot be transmitted by the DU and the CU cooperatively after the base station is separated into the CU and the DU exists in the related art.

No effective solution has yet been proposed for the above problem in the existing art.

SUMMARY

Embodiments of the present disclosure provide a method and device for transmitting a paging message and a storage medium.

According to an embodiment of the present disclosure, a method for transmitting a paging message is provided. The method includes: generating a paging message, and transmitting the paging message to a distributed network unit (DU). The paging message includes assistance information, and the assistance information is used for instructing the DU to transmit the paging message.

According to another embodiment of the present disclosure, a method for transmitting a paging message is further provided. The method includes: receiving a paging message transmitted by a centralized network unit (CU), where the paging message includes assistance information; and transmitting the paging message according to the assistance information.

According to another embodiment of the present disclosure, a device for transmitting a paging message is provided. The device includes a generation module, which is configured to generate a paging message, and a first transmission module, which is configured to transmit the paging message to a DU, where the paging message includes assistance information, and the assistance information is used for instructing the DU to transmit the paging message.

According to another embodiment of the present disclosure, a device for transmitting a paging message is further provided. The device includes a reception module, which is configured to receive a paging message transmitted by a CU, where the paging message includes assistance information, and a second transmission module, which is configured to transmit the paging message according to the assistance information.

According to another embodiment of the present disclosure, a storage medium is further provided. The storage medium includes stored programs which, when executed, perform the method of any one of the embodiments described above.

According to another embodiment of the present disclosure, a processor is further provided. The processor is used for executing programs, which, when executed, perform the method of any one of the embodiments described above.

In the present disclosure, after the CU generates the paging message, the CU transmits the paging message to the DU, and the DU is instructed to transmit the paging message according to the assistance information carried in the paging message. Therefore, the problem in the related art that the paging message cannot be transmitted by the DU and the CU cooperatively after the base station is separated into the CU and the DU may be solved, so as to achieve the effect of timely transmitting the paging message through the CU and the DU.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure. In the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Figure 1:
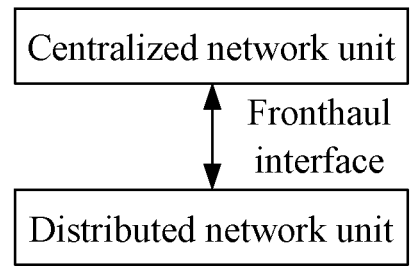
FIG. 1 is a schematic diagram of a separated architecture of a centralized network unit and a distributed network unit in the related art.
Figure 2:
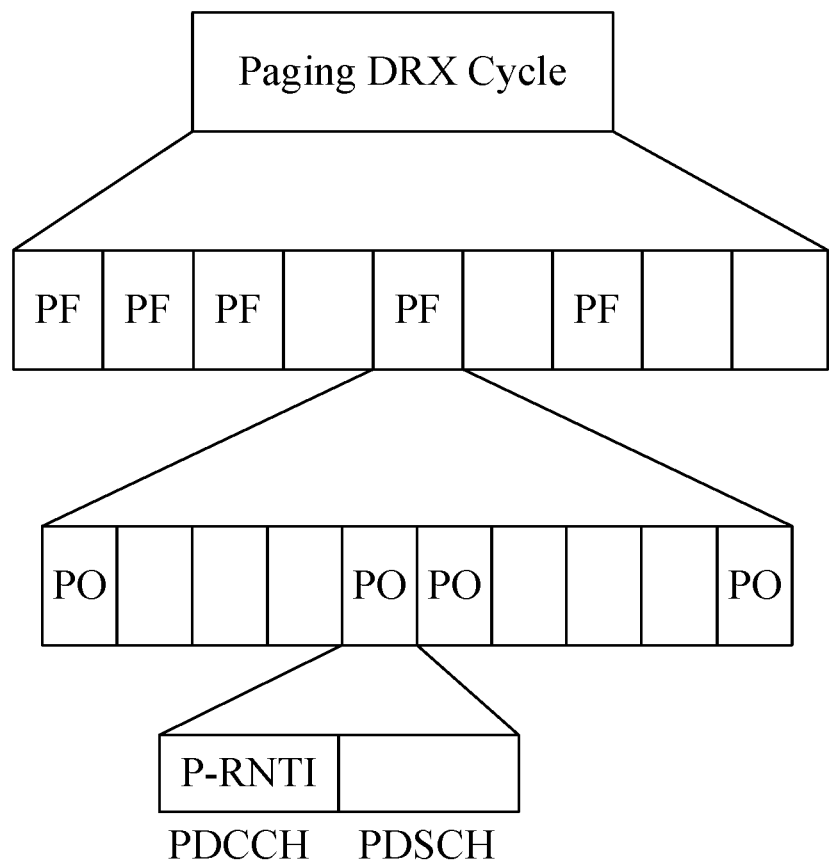
FIG. 2 is a schematic diagram of a paging mechanism in the related art.
Figure 3:
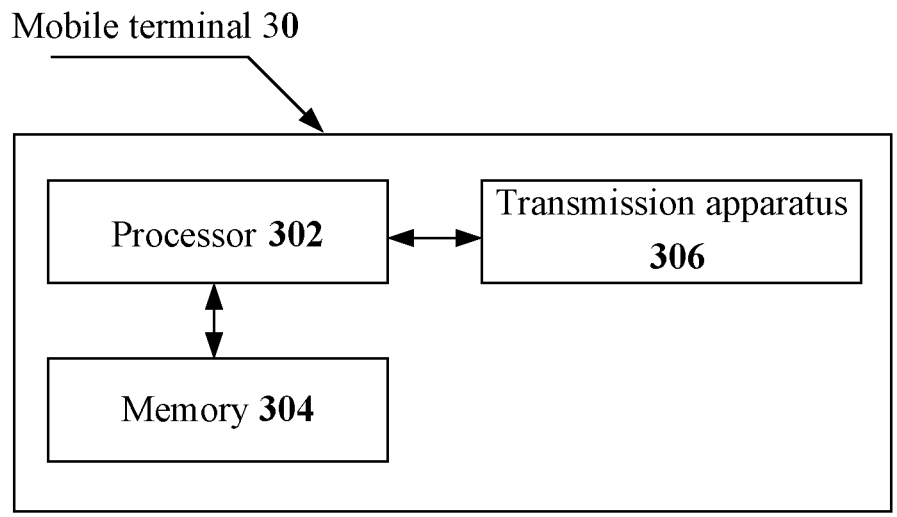
FIG. 3 is a block diagram of hardware of a mobile terminal of a method for transmitting a paging message according to an embodiment of the present disclosure.

Method embodiments provided by the present application may be executed in a mobile terminal, a computer terminal or other similar computing devices. Taking the method to be executed in the mobile terminal as an example, FIG. 3 is a block diagram of hardware of a mobile terminal of a method for transmitting a paging message according to an embodiment of the present disclosure. As shown in FIG. 3, a mobile terminal 30 may include one or more (only one is shown in FIG. 3) processors 302 (the processors 302 may include, but are not limited to, a processing apparatus such as a microcontroller unit (MCU) and a field programmable gate array (FPGA)), a memory 304 configured to store data, and a transmission apparatus 306 configured to implement a communication function. It should be understood by those skilled in the art that the structure shown in FIG. 3 is merely illustrative, and not intended to limit the structure of the electronic apparatus described above. For example, the mobile terminal 30 may further include more or fewer components than that shown in FIG. 3, or may have a configuration different from the configuration shown in FIG. 3.

The memory 304 may be configure as software programs and modules for storing application software, such as program instructions/modules corresponding to the method for transmitting a paging message in the embodiments of the present disclosure. The processor 302 executes the software programs and modules stored in the memory 304 so as to perform various function applications and data processing, that is, to implement the method described above. The memory 304 may include a high-speed random access memory, and may further include a non-volatile memory, such as one or more magnetic storage devices, flash memories or other non-volatile solid-state memories. In some examples, the memory 304 may further include memories that are remotely disposed with respect to the processors 302. These remote memories may be connected to the mobile terminal 30 via a network. Examples of the preceding network include, but are not limited to, the Internet, an intranet, a local area network, a mobile communication network and a combination thereof.

The transmission apparatus 306 is configured to receive or send data via a network. Specific examples of such a network described above may include a wireless network provided by a communication provider of the mobile terminal 30. In one example, the transmission apparatus 306 includes a network interface controller (NIC), which may be connected to other network devices via a base station, thereby communicating with the Internet. In one example, the transmission apparatus 106 may be a radio frequency (RF) module, which is configured to communicate with the Internet in a wireless way.

Figure 4:
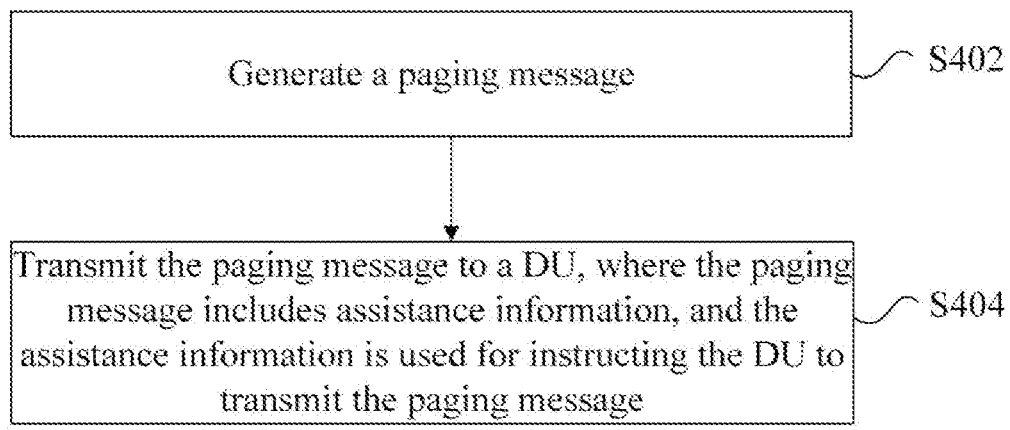
FIG. 4 is a flowchart (1) of a method for transmitting a paging message according to an embodiment of the present disclosure.

An embodiment provides a method for transmitting a paging message. FIG. 4 is a flowchart (1) of a method for transmitting the paging message according to an embodiment of the present disclosure. As shown in FIG. 4, the process includes the following steps.

In step S402, the paging message is generated.

In step S404, the paging message is transmitted to a DU. The above paging message includes assistance information, and the assistance information is used for instructing the DU to transmit the paging message.

In the above steps, after generating the paging message, the CU transmits the paging message to the DU, and instructs DU to transmit the paging message according to the assistance information carried in the paging message. Therefore, the problem in the related art that the paging message cannot be cooperatively transmitted by the DU and the CU after the base station is separated into the CU and the DU may be solved, so as to achieve the effect of timely transmitting the paging message through the CU and the DU.

Optionally, the above steps may, but may not necessarily, be executed by the CU.

In an optional embodiment, the above assistance information includes at least one of: expected transmission time information of the paging message, expected transmission area information of the paging message, expected transmission frequency information of the paging message, user type information corresponding to the paging message, and repeated transmission information of the paging message. The above repeated transmission information of the paging message is used for instructing the DU to calculate the number of times of repeatedly transmitting the paging message. In this embodiment, the user type includes an ordinary terminal user, and also includes a machine type communication terminal user or a terminal user defined according to a predetermined protocol.

In an optional embodiment, the above expected transmission time information includes at least one of: an expected transmission time point of the paging message and a parameter for calculating the expected transmission time point of the paging message. The parameter is used for instructing the DU to calculate a time point of transmitting the paging message. In this embodiment, the expected transmission time information may be predefined or may be calculated from measurement.

In an optional embodiment, the above expected transmission area information includes at least one of: a list of cells where the paging message is expected to be transmitted, a location area where the paging message is expected to be transmitted, and a radio access network (RAN) paging area where the paging message is expected to be transmitted.

In an optional embodiment, the expected transmission frequency information includes at least one of: an expected transmission bandwidth of the paging message, and an expected transmission frequency of the paging message.

In an optional embodiment, the step that the paging message is transmitted to the DU includes: searching for, according to the expected transmission area information of the paging message, the DU where a transmission area to which the paging message is transmitted belongs, and transmitting the paging message to the DU where the transmission area belongs. In this embodiment, different transmission areas may belong to different DUs, or may belong to one DU.

In an optional embodiment, the step that the paging message is transmitted to the DU includes: transmitting a DU synchronization message to the DU, receiving a response message transmitted by the DU according to the DU synchronization message, calculating a transmission latency with the DU according to the response message, and before the expected transmission time point of the paging message, transmitting the paging message to the DU according to the transmission latency. In this embodiment, no matter how large the transmission latency is, the paging message is transmitted according to the transmission latency.

In an optional embodiment, the paging message further includes terminal paging record information.

In an optional embodiment, the step that the paging message is transmitted to the DU includes one of: calculating the expected transmission time point of the paging message according to a discontinuous reception (DRX) parameter of a terminal, placing the expected transmission time point in the assistance information, and transmitting the paging message carrying the assistance information to the DU; and placing the DRX parameter of the terminal in the assistance information, and transmitting the paging message carrying the assistance information to the DU. The DRX parameter instructs the DU to calculate the expected transmission time point of the paging message.

Figure 5:
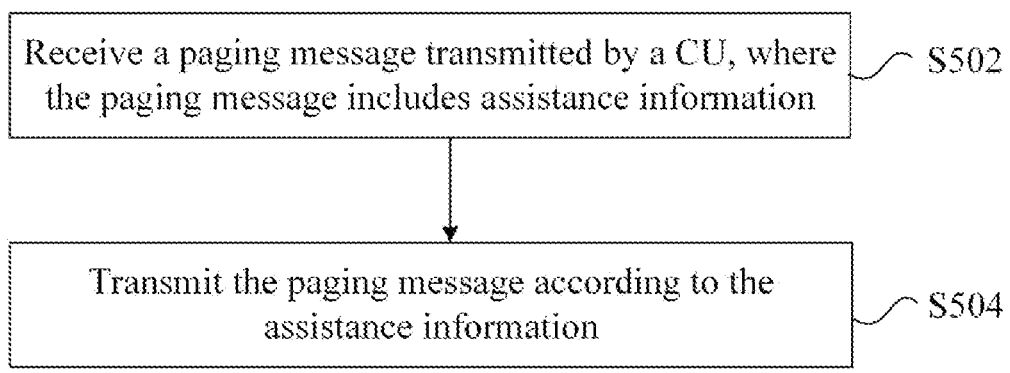
FIG. 5 is a flowchart (2) of a method for transmitting a paging message according to an embodiment of the present disclosure.

An embodiment provides a method for transmitting a paging message. FIG. 5 is a flowchart (2) of a method for transmitting a paging message according to an embodiment of the present disclosure. As shown in FIG. 5, the process includes the following steps.

In step S502, a paging message transmitted by a CU is received. The paging message includes assistance information.

In step S504, the paging message is transmitted according to the assistance information.

In the above steps, the DU receives the paging message transmitted by the CU, where the paging message includes the assistance information, and the DU transmits the paging message according to the assistance information. Therefore, the problem in the related art that the paging message cannot be cooperatively transmitted by the DU and the CU after the base station is separated into the CU and the DU may be solved, so as to achieve the effect of timely transmitting the paging message through the CU and the DU.

Optionally, the above steps may, but may not necessarily, be executed by the DU.

In an optional embodiment, the above assistance information includes at least one of: expected transmission time information of the paging message, expected transmission area information of the paging message, expected transmission frequency information of the paging message, user type information corresponding to the paging message, and repeated transmission information of the paging message.

In an optional embodiment, the step that the paging message is transmitted according to the assistance information includes: determining a transmission time point of the paging message according to the assistance information, and transmitting the paging message in a preset transmission manner at the transmission time point. The preset transmission manner is determined through at least one of following information: a transmission area of the paging message, a transmission frequency of the paging message, and the number of times of repeatedly transmitting the paging message.

In an optional embodiment, the step of determining the transmission time point of the paging message according to the assistance information includes at least one of: determining the transmission time point according to a time point explicitly indicated in the assistance information, and determining the transmission time point according to a DRX parameter carried in the assistance information.

In an optional embodiment, the transmission area of the paging message is determined according to at least one of following information carried in the assistance information: a list of cells where the paging message is expected to be transmitted, a location area where the paging message is expected to be transmitted, and an RAN paging area where the paging message is preset to be transmitted.

In an optional embodiment, the transmission frequency of the paging message is determined according to at least one of following information carried in the assistance information: an expected transmission bandwidth of the paging message; and an expected transmission frequency of the paging message.

In an optional embodiment, the number of times repeatedly transmitting the paging message is determined according to following information carried in the assistance information: repeated transmission information.

In an optional embodiment, before the step that the paging message is transmitted according to the assistance information, the method further includes: carrying pieces of terminal paging record information with the same transmission time point on one or more paging messages. In this embodiment, if one paging message includes too many UE paging records, it may result in that the paging message is too large and exceeds the transmission resource of radio scheduling, so this paging message may be partitioned into several small paging messages to be transmitted separately.

In an optional embodiment, before the step that the paging message is transmitted according to the assistance information, the method further includes: combining pieces of terminal paging record information with the same transmission time point into one paging message. In this embodiment, if the expected transmission time points calculated by some UEs are different, pieces of UE paging record information with the same time point are combined into one paging message, and one paging message is used to page multiple UEs.

In an optional embodiment, after the step that the paging message transmitted by the CU is received, the method further includes: transmitting a response message to the CU. The response message is used for indicating that the paging message is received.

In an optional embodiment, when the paging message is transmitted according to the assistance information, the method further includes: on the condition that the paging message is transmitted abnormally, transmitting a paging abnormal message to the CU. The paging abnormal message includes a reason for failing to transmitting the paging message.

In an optional embodiment, the step of on the condition that the paging message is transmitted abnormally, transmitting the paging abnormal message to the CU includes: in response to determining that an abnormal event of missing a preset transmission time point occurs on transmitting the paging message, transmitting the paging abnormal message including transmission time advance information to the CU. The time advance information is used for instructing the CU to adjust a time point of transmitting the paging message.

In an optional embodiment, the paging message further includes terminal paging record information.

The present disclosure will be described in detail hereinafter in conjunction with specific examples.

Example 1

This example provides a paging method suitable for the case that the CU and the DU are separated. The method specifically includes the content described below.

(1) The CU generates a paging message including paging record information of one or more terminals, transmits the paging message to the DU, and carries assistance information of the paging message in the paging message when the CU transmits the paging message to the DU.

(2) The CU calculates expected transmission time point information of the paging message in an air interface according to a parameter of a designated terminal such as a DRX parameter, and places the expected transmission time point information in the assistance information. In addition, the CU may also place the parameter of the designated terminal for calculating the expected transmission time point information, such as the DRX parameter, in the assistance information, and the DU calculates the actual expected transmission time point.

(3) The CU sets the assistance information. The assistance information includes one or a combination of following information: 1. expected transmission time information of the paging message; 2. expected transmission area information of the paging message; 3. expected transmission frequency information of the paging message; 4. user type information corresponding to the paging message; and 5. repeated transmission information of the paging message.

(4) The expected transmission time information of the paging message in the assistance information set by the CU may be one of following information: 1. an expected transmission time point of the paging message (e.g., the combination of the expected transmitted information, such as a system frame number (SFN), a sub-frame, a time slot, etc.); and 2. a parameter, such as a DRX parameter, for calculating the expected transmission time point of a terminal, which is used for the DU to derive the expected transmission time point.

(5) The expected transmission area information of the paging message in the assistance information set by the CU may be one or a combination of: 1. a list of cells where the paging message is expected to be transmitted; 2. a location area where the paging message is expected to be transmitted; and 3. an RAN paging area where the paging message is expected to be transmitted.

(6) The expected transmission frequency information of the paging message in the assistance information set by the CU may be one or a combination of: 1. an expected transmission bandwidth of the paging message; and 2. an expected transmission frequency of the paging message.

(7) The user type information of the paging message in the assistance information set by the CU may be an ordinary terminal, a machine type communication (MTC) terminal, or other types of terminals clearly defined in the protocol.

(8) The repeated transmission information of the paging message in the assistance information set by the CU is used for indicating the number of times the paging message needs to be repeatedly transmitted.

(9) The CU searches for the DU where a transmission area belongs according to the expected transmission area of the paging message, and the CU transmits the paging message to the DU where the transmission area belongs.

(10) The CU may use a method for estimating the transmission latency between the CU and the DU. The method may be used for the CU to transmit the paging message to the DU in advance, so as to avoid missing the expected transmission time point of the paging message in the air interface due to the latency. The CU transmits a "DU synchronization message" to the DU. The synchronization message carries a time point T1 at which the CU transmits the message. After receiving the "DU synchronization message", the DU records a time point T2 when the DU synchronization message is received, and transmits a "DU synchronization response message" to the CU at a time point T3, where the response message carries the time point information of T1, T2 and T3. After receiving the "DU synchronization response message", the CU records a time point T4 when the DU synchronization response message is received. A latency calculation module in the CU may calculate the transmission latency from the CU to the DU according to the T1, T2, T3 and T4. When the CU transmits the paging message to the DU, the CU may estimate the transmission latency between the CU and the designated DU by transmitting the "DU synchronization message" to the DU in advance and by receiving the "DU synchronization response message". Before the expected transmission time point, the CU may transmit the paging message to the DU in advance according to this transmission latency.

(11) After receiving the paging message of the CU, the DU may transmit a response message of the paging message" to the CU to inform the CU that the paging message has been successfully received. Optionally, after the DU receives the paging message of the CU, the DU transmits a "paging abnormal indication message" to the CU if the paging message cannot be transmitted from the DU. Optionally, this paging abnormal indication message may carry an abnormal reason (e.g., a designated paging range in the paging message is not in the range of this DU, the expected transmission time point carried in the paging message has been missed, and so on). Optionally, if the abnormal reason is that the expected transmission time point carried in the paging message has been missed, the "paging abnormal indication message" may carry transmission time advance information to instruct the CU to adjust the time point of transmitting the paging message to the DU, so as to avoid that the DU misses the expected transmission time point in the paging message.

(12) The DU receives the paging message and the assistance information of the paging message transmitted from the CU, and determines the transmission time point of the received paging message according to the assistance information. The DU determines the transmission time point of the paging message in one of methods: determining the transmission time point according to a time point explicitly indicated in the assistance information (the time point may be a combination of SFNs, sub-frames and slots), or deriving an estimated transmission time point according to the parameter such as a DRX parameter carried in the assistance information.

(13) The DU receives the paging message and the assistance information of the paging message transmitted from the CU, and determines the transmission area of the paging message according to the paging assistance information. The transmission area information of the paging message may be determined by one or a combination of following information carried in the paging assistance information: 1. a list of cells where the paging message is expected to be transmitted carried in the assistance information; 2. a location area where the paging message is expected to be transmitted carried in the assistance information; and 3. an RAN paging area where the paging message is expected to be transmitted carried in the assistance information.

(14) The DU receives the paging message and the assistance information of the paging message transmitted from the CU, and determines the transmission frequency of the paging message according to the assistance information. The transmission frequency information of the paging message may be determined by following information carried in the assistance information: 1. an expected transmission bandwidth of the paging message carried in the assistance information; and 2. an expected transmission frequency of the paging message carried in the assistance information.

(15) The DU receives the paging message and the assistance information of the paging message transmitted from the CU, and determines the number of times of repeatedly transmitting the paging message according to the assistance information. The number of times of repeatedly transmitting the paging message is determined according to following information carried in the assistance information: repeated transmission information of the paging message carried in the assistance information.

(16) The DU receives the paging message and the paging assistance information transmitted from the CU, and may carry paging records of one or more terminals with the same transmission time point on one or more paging messages. The DU may combine paging records of one or more terminals with the same transmission time point into one paging message.

(17) The DU transmits the paging message in a specific manner at a designated time point according to the expected transmission time point of the paging message. The specific transmission manner accords with the paging message transmission area, the paging message transmission frequency and the number of times of repeatedly transmitting the paging message, which are determined by the DU.

Example 2

Figure 6:
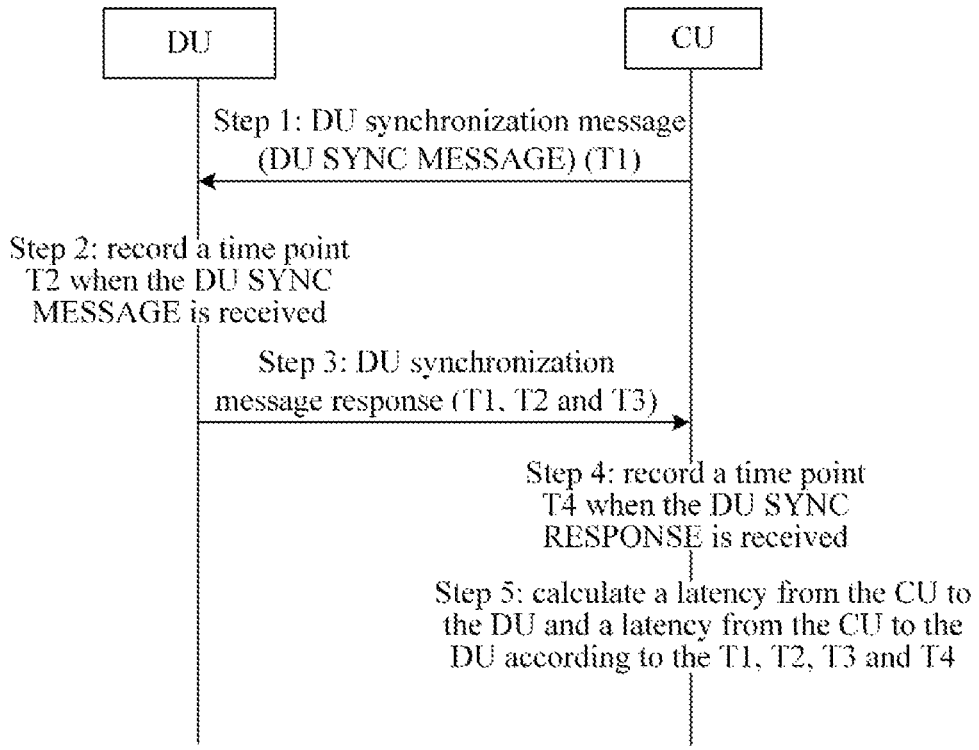
FIG. 6 is a flowchart of a method for estimating transmission latency between the CU and the DU according to the embodiment of the present disclosure.

FIG. 6 is a flowchart of a method for estimating transmission latency between the CU and the DU according to the embodiment of the present disclosure. As shown in FIG. 6, the method includes steps described below.

In step 1, the CU transmits a "DU synchronization message" to the DU. The DU synchronization message carries a time point T1 at which the CU transmits this message.

In step 2, after receiving the "DU synchronization message", the DU records a time point T2 at which this message is received.

In step 3, the DU transmits a "DU synchronization response message" to the CU at a time point T3. The response message carries time point information of T1, T2, and T3.

In step 4, after receiving the "DU synchronization response message", the CU records a time point T4 to which this message is received.

In step 5, a latency calculation module in the CU may calculate the transmission latency between the CU to the DU according to the T1, T2, T3 and T4 (e.g., the transmission latency from the CU to the DU is (T2−T1), and the transmission latency from the DU to the CU is (T4−T3); the latency between the CU and the DU is considered to be (T2−T1+T4−T3)/2; or multiple latency estimations may be performed according to the above latency estimation methods, and an average value of the multiple latency estimations is calculated as the transmission latency from the CU to the DU).

Example 3

Figure 7:
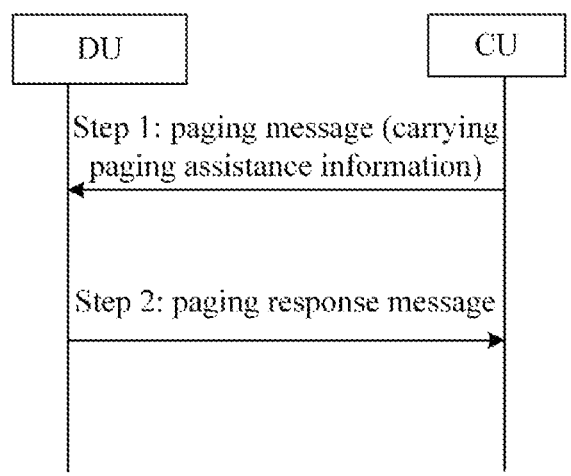
FIG. 7 is a flowchart of a method for responding that the DU successfully receives the paging message according to an embodiment of the present disclosure.

FIG. 7 is a flowchart of a method for responding that the DU successfully receives the paging message according to an embodiment of the present disclosure. The method includes steps described below.

In step 1, the CU generates a paging message including paging record information of one or more terminals, transmits the paging message to the DU, and carries assistance information in the paging message transmitted to the DU.

In step 2, if the DU successfully receives the paging message and determines that the configuration of the assistance information in the paging message is correct, the DU transmits a paging response message to the CU to inform the CU that the paging message has been successfully received.

Figure 8:
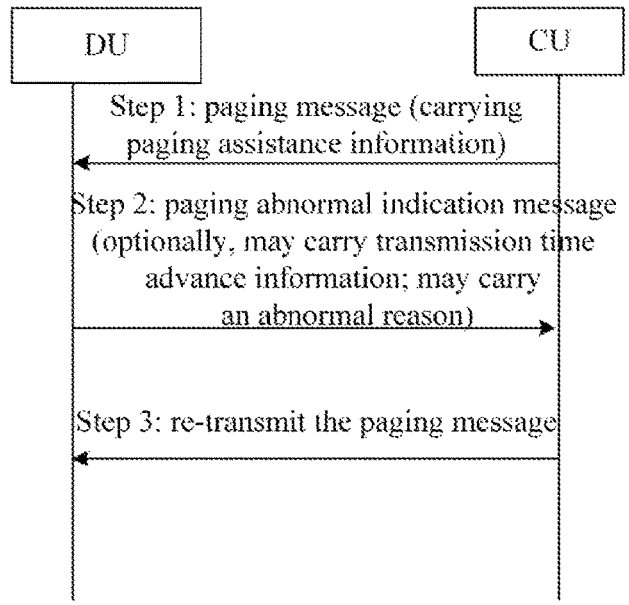
FIG. 8 is a flowchart of a method for responding an abnormal paging message between the CU and the DU according to an embodiment of the present disclosure.

FIG. 8 is a flowchart of a method for responding a paging message abnormal between the CU and the DU according to an embodiment of the present disclosure. As shown in FIG. 8, the method includes steps described below.

In step 1, the CU generates a paging message including paging record information of one or more terminals, transmits the paging message to the DU, and carries assistance information in the paging message transmitted to the DU.

In step 2, if the DU fails to transmit the paging message in the air interface, the DU needs to feedback a "paging abnormal indication message" to the CU. Optionally, this message may carry an abnormal reason (e.g., a designated paging range in the paging message is not in the range of this DU, the expected transmission time point carried in the paging message has been missed, and so on). Optionally, if the abnormal reason is that the expected transmission time point carried in the paging message has been missed, the "paging abnormal indication message" may carry transmission time advance information to instruct the CU to adjust the time point of transmitting the paging message to the DU, so as to avoid that the DU misses the expected transmission time point in the paging message.

In step 3, after receiving the "paging abnormal indication message" of the DU, the CU may re-transmit the paging message to the DU. For example, if the "paging abnormal indication message" carries the transmission time advance information, the CU adjusts the time point of transmitting the paging message to the DU according to the transmission time advance information, and re-transmits the paging message to the DU at the adjusted time point.

Figure 9:
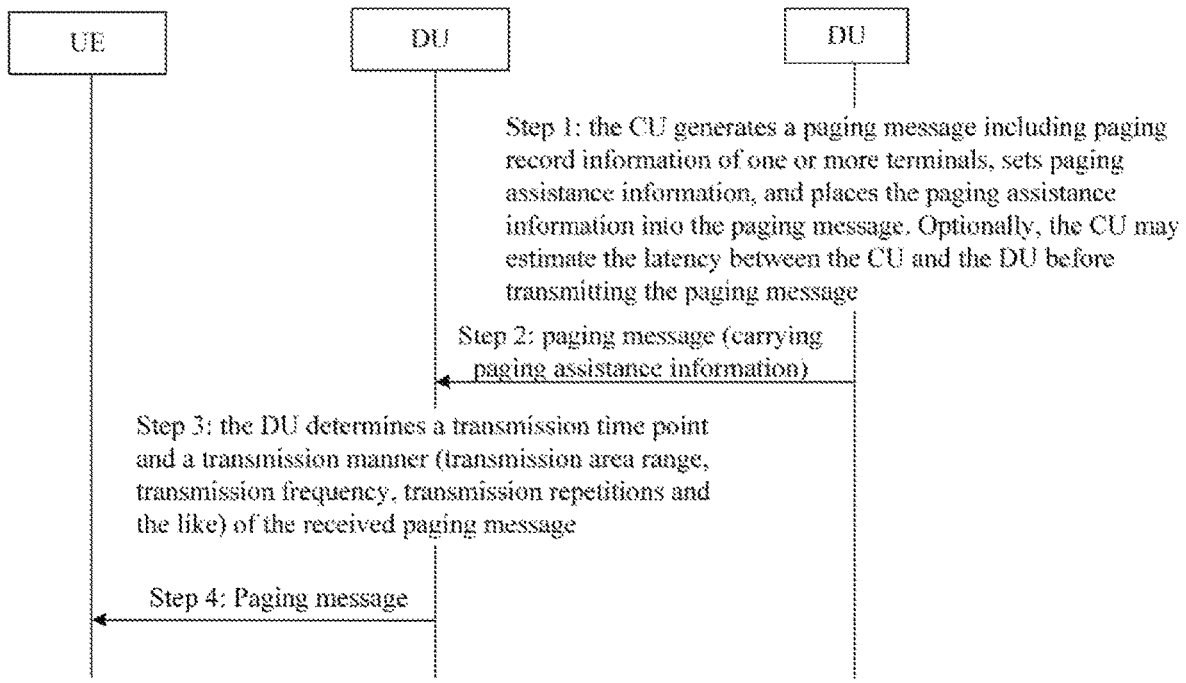
FIG. 9 is a flowchart of a method for transmitting a paging message between the CU and the DU according to an embodiment of the present disclosure.

FIG. 9 is a flowchart of a method for transmitting a paging message between the CU and the DU according to an embodiment of the present disclosure. As shown in FIG. 9, the method includes steps described below.

In step 1, the CU generates a paging message including paging record information of one or more terminals, transmits the paging message to the DU, and carries assistance information in the paging message transmitted to the DU. Optionally, the CU calculates expected transmission time point information of the paging message in the air interface according to a parameter such as a DRX parameter of a designated terminal, and places the expected transmission time point information in the assistance information. Optionally, the CU may also place the parameter, such as the DRX parameter of the designated terminal, in the assistance information, where the parameter is used for calculating the expected transmission time point information, and the DU calculates the actual expected transmission time point. The CU sets the assistance information, and the assistance information includes one or a combination of following information: 1. expected transmission time information of the paging message; 2. expected transmission area information of the paging message; 3. expected transmission frequency information of the paging message; 4. user type information corresponding to the paging message; and 5. repeated transmission information of the paging message. The expected transmission time information of the paging message in the assistance information set by the CU may be one of following information: 1. an expected transmission time point of the paging message (e.g., the combination of the expected transmitted information, such as an SFN, a sub-frame, a time slot, etc.); and 2. a parameter, such as a DRX parameter, for calculating the expected transmission time point of a terminal, which is used for the DU to derive a time point. The expected transmission area information of the paging message in the assistance information set by the CU may be one or a combination of: 1. a list of cells where the paging message is expected to be transmitted; 2. a location area where the paging message is expected to be transmitted; and 3. an RAN paging area where the paging message is expected to be transmitted. The expected transmission frequency information of the paging message in the assistance information set by the CU may be one or a combination of: 1. an expected transmission bandwidth of the paging message; and 2. an expected transmission frequency point of the paging message. The user type information of the paging message in the assistance information set by the CU may be an ordinary terminal, an MTC terminal, or other types of terminals clearly defined in the protocol. The repeated transmission information of the paging message in the assistance information set by the CU is used for indicating the number of times the paging message needs to be repeatedly transmitted.

Optionally, the CU, before transmitting the paging message, may use the method in Example 1 to estimate the latency between the CU and the DU. The method may be used for the CU to transmit the paging message to the DU in advance, so as to avoid missing the expected transmission time point of the paging message in the air interface due to the latency.

In step 2, the CU, according to the expected transmission area of the paging message, searches for a DU to which the transmission area belongs, and the CU transmits the paging message to this DU. The paging message carries the paging assistance information.

In step 3, the DU receives the paging message and the paging assistance information transmitted from the CU, and determines the transmission time point of the received paging message according to the paging assistance information. The DU determines the transmission time point of the paging message by one of methods: 1. determining the transmission time point according to a time point explicitly indicated in the assistance information (the time point may be a combination of SFNs, sub-frames and slots), or 2. deriving an estimated transmission time point according to the parameter such as the DRX parameter carried in the paging assistance information.

The DU receives the paging message and the paging assistance information transmitted from the CU, and determines the transmission area of the paging message according to the paging assistance information. The transmission area information of the paging message may be determined by one or a combination of following information carried in the paging assistance information: 1. a list of cells where the paging message is expected to be transmitted carried in the assistance information; 2. a location area where the paging message is expected to be transmitted carried in the assistance information; and 3. an RAN paging area where the paging message is expected to be transmitted carried in the assistance information. The DU receives the paging message and the paging assistance information transmitted from the CU, and determines the transmission frequency of the paging message according to the paging assistance information. The transmission frequency information of the paging message may be determined by following information carried in the paging assistance information: 1. an expected transmission bandwidth of the paging message carried in the assistance information; and 2. an expected transmission frequency point of the paging message carried in the assistance information.

The DU receives the paging message and the paging assistance information transmitted from the CU, and determines the number of times of repeatedly transmitting the paging message according to the paging assistance information.

The number of times of repeatedly transmitting the paging message is determined according to following information carried in the paging assistance information: repeated transmission information of the paging message carried in the assistance information.

The DU receives the paging message and the paging assistance information transmitted from the CU, and may carry paging records of one or more terminals with the same transmission time point on one or more paging messages. The DU may combine paging records of one or more terminals with the same transmission time point into one paging message.

Optionally, after the DU receives the paging message of the CU, the DU transmits a paging response message or a paging abnormal indication message to the CU according to the method described in Example 2 and Example 3.

In step 4, the DU transmits the paging message in a specific manner at a designated time point according to the expected transmission time point of the paging message. The specific transmission manner accords with the paging message transmission area, the paging message transmission frequency and the number of times of repeatedly transmitting the paging message, which are determined by the DU.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the technical solution of the present disclosure substantially, or the part contributing to the existing art, may be embodied in the form of a software product. The software product is stored on a storage medium (such as a Read-Only Memory (ROM), a Random Access Memory (RAM), a magnetic disk, or an optical disk) and includes several instructions for enabling a terminal device (which may be a mobile phone, a computer, a server, or a network device) to execute the method described in each embodiment of the present disclosure.

This embodiment provides a device for transmitting a paging message. The device is configured to implement the above-mentioned embodiments and examples. What has been described will not be repeated. As used below, a term "module" may be software, hardware or a combination thereof capable of implementing predetermined functions. The device in the embodiment described below is preferably implemented by software, but implementation by hardware or by a combination of software and hardware is also possible and conceived.

Figure 10:
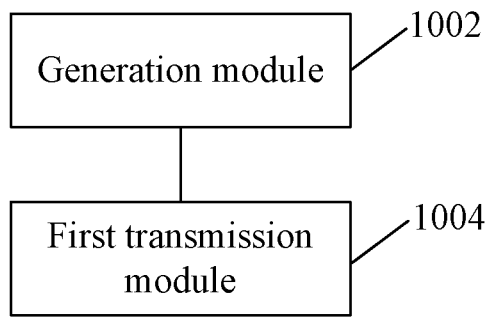
FIG. 10 is a structural diagram (1) of a device according to an embodiment of the present disclosure.

FIG. 10 is a structural diagram (1) of a device according to an embodiment of the present disclosure. As shown in FIG. 10, the device includes a generation module 1002 and a first transmission module 1004. The device will be described in detail below.

The generation module 1002 is configured to generate a paging message. The first transmission module 1004 is connected to the generation module 1002 and is configured to transmit the paging message to a DU. The paging message includes assistance information, and the assistance information is used for instructing the DU to transmit the paging message.

In an optional embodiment, the above assistance information includes at least one of: expected transmission time information of the paging message, expected transmission area information of the paging message, expected transmission frequency information of the paging message, user type information corresponding to the paging message, and repeated transmission information of the paging message. The above repeated transmission information of the paging message is used for instructing the DU to calculate the number of times of repeatedly transmitting the paging message.

In an optional embodiment, the above expected transmission time information includes at least one of: an expected transmission time point of the paging message and a parameter for calculating the expected transmission time point of the paging message. The parameter is used for instructing the DU to calculate a time point of transmitting the paging message.

In an optional embodiment, the above expected transmission area information includes at least one of: a list of cells where the paging message is expected to be transmitted, a location area where the paging message is expected to be transmitted, and an RAN paging area where the paging message is expected to be transmitted.

In an optional embodiment, the expected transmission frequency information includes at least one of: an expected transmission bandwidth of the paging message, and an expected transmission frequency of the paging message.

In an optional embodiment, the first transmission module 1004 transmits the paging message to the DU through the following manner: searching for, according to the expected transmission area information of the paging message, the DU where a transmission area to which the paging message is transmitted belongs, and transmitting the paging message to the DU where the transmission area belongs.

In an optional embodiment, the first transmission module 1004 transmits the paging message to the DU through the following manner: transmitting a DU synchronization message to the DU, receiving a response message transmitted by the DU according to the DU synchronization message, calculating a transmission latency with the DU according to the response message, and before the expected transmission time point of the paging message, transmitting the paging message to the DU according to the transmission latency.

In an optional embodiment, the paging message further includes terminal paging record information.

In an optional embodiment, the first transmission module 1004 transmits the paging message to the DU through one of following manners: calculating the expected transmission time point of the paging message according to a DRX parameter of a terminal, placing the expected transmission time point in the assistance information, and transmitting the paging message carrying the assistance information to the DU; or placing the DRX parameter of the terminal in the assistance information, and transmitting the paging message carrying the assistance information to the DU, where the DRX parameter instructs the DU to calculate the expected transmission time point of the paging message.

Figure 11:
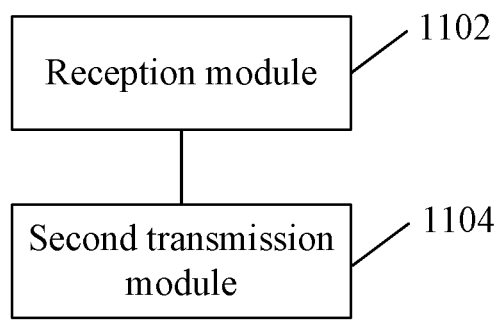
FIG. 11 is a structural diagram (2) of a device according to an embodiment of the present disclosure.

FIG. 11 is a structural diagram (2) of a device according to an embodiment of the present disclosure. As shown in FIG. 11, the device includes a reception module 1102 and a second transmission module 1104. The device will be described in detail below.

The reception module 1102 is configured to receive a paging message transmitted by a CU, where the paging message includes assistance information. The second transmission module 1104 is connected to the reception module 1102 and is configured to transmit the paging message according to the assistance information.

In an optional embodiment, the above assistance information includes at least one of: expected transmission time information of the paging message, expected transmission area information of the paging message, expected transmission frequency information of the paging message, user type information corresponding to the paging message, and repeated transmission information of the paging message.

In an optional embodiment, the second transmission module 1104 transmits the paging message according to the assistance information through the following manner: determining a transmission time point of the paging message according to the assistance information, and transmitting the paging message in a preset transmission manner at the transmission time point. The preset transmission manner is determined through at least one of following information: a transmission area of the paging message, a transmission frequency of the paging message, and the number of times of repeatedly transmitting the paging message.

In an optional embodiment, the device determines the transmission time point of the paging message according to the assistance information through at least one of following manners: determining the transmission time point according to a time point explicitly indicated in the assistance information, or determining the transmission time point according to the DRX parameter carried in the assistance information.

In an optional embodiment, the device determines the transmission area of the paging message according to at least one of following information carried in the assistance information: a list of cells where the paging message is expected to be transmitted, a location area where the paging message is expected to be transmitted, and an RAN paging area where the paging message is preset to be transmitted.

In an optional embodiment, the device determines the transmission frequency of the paging message according to at least one of following information carried in the assistance information: an expected transmission bandwidth of the paging message; and an expected transmission frequency of the paging message.

In an optional embodiment, the device determines the number of times of repeatedly transmitting the paging message according to following information carried in the assistance information: repeated transmission information carried in the assistance information.

In an optional embodiment, the device further includes a carrying module. The carrying module is configured to, before the paging message is transmitted according to the assistance information, carry pieces of terminal paging record information with the same transmission time point on one or more paging messages.

In an optional embodiment, the device further includes a combining module. The combining module is configured to, before the paging message is transmitted according to the assistance information, combine pieces of terminal paging record information with the same transmission time point into one paging message.

In an optional embodiment, the device further includes a third transmission module. The third transmission module is configured to, after the paging message transmitted by the CU is received, transmit a response message to the CU. The response message is used for indicating that the paging message is received.

In an optional embodiment, the device further includes a fourth transmission module. The fourth transmission module is configured to, when the paging message is transmitted according to the assistance information, in a case where the paging message is transmitted abnormally, transmit a paging abnormal message to the CU. The paging abnormal message includes a reason for failing to transmitting the paging message.

In an optional embodiment, a fifth transmission module transmits the paging abnormal message to the CU on the condition that the paging message is transmitted abnormally through the following manner: in response to determining that an abnormal event of missing a preset transmission time point occurs on transmitting the paging message, transmitting the paging abnormal message including transmission time advance information to the CU. The time advance information is used for instructing the CU to adjust a time point of transmitting the paging message.

In an optional embodiment, the paging message further includes terminal paging record information.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

An embodiment of the present disclosure further provides a storage medium. The storage medium includes a stored program which, when executed, executes any of above-mentioned methods.

Optionally, in this embodiment, the storage medium may be configured to store program codes for executing the steps described above.

Optionally, in this embodiment, the storage medium may, but is not limited to, include a USB disk, an ROM, an RAM, a mobile hard disk, a magnetic disk, an optical disk or another medium capable of storing program codes.

An embodiment of the present disclosure further provides a processor. The processor is configured to execute programs which, when executed, perform the steps in the method of any one of the above-mentioned embodiments.

Optionally, for specific examples in this embodiment, reference may be made to the examples described in the above-mentioned embodiments and optional embodiments, and repetition will not be made in this embodiment.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and not intended to limit the present disclosure.

What is claimed is:

1. A wireless communication method, comprising:
receiving, by a distributed unit (DU) of a base station in a 5G network from a centralized unit (CU) of the base station, a paging message, wherein the paging message comprises assistance information that comprises a discontinuous reception (DRX) parameter and a list of cells;
determining, by the DU, a transmission time point of the paging message according to the DRX parameter; and
transmitting, by the DU to a user equipment (UE), the paging message at the transmission time point according to the assistance information.

2. The wireless communication method of claim 1, wherein transmitting the paging message according to the assistance information further comprises:
determining, by the DU, a transmission area of the paging message according to the list of cells; and
transmitting, by the DU to the UE, the paging message at the transmission area.

3. The wireless communication method of claim 1, further comprising:
on a condition that the paging message is transmitted abnormally, transmitting, by the DU to the CU, a paging abnormal message, wherein the paging abnormal message comprises a reason for failing to transmitting the paging message.

4. The wireless communication method of claim 3, wherein transmitting a paging abnormal message further comprises:
in response to determining that an abnormal event of missing a preset transmission time point occurs when transmitting the paging message, transmitting, by the DU to the CU, time advance information, wherein the time advance information is to instruct the CU to adjust a time point of transmitting the paging message.

5. The wireless communication method of claim 1, wherein the paging message further comprises terminal paging record information.

6. A wireless communication method, comprising:
generating, by a centralized unit (CU) of a base station in a 5G network, a paging message; and
transmitting, by the CU to a distributed unit (DU) of the base station, the paging message,
wherein the paging message comprises assistance information that comprises a discontinuous reception (DRX) parameter and a list of cells, and wherein the DRX parameter is configured for the DU to calculate a transmission time point for transmitting the paging message.

7. The wireless communication method of claim 6, wherein transmitting the paging message further comprises:
placing, by the CU, the DRX parameter in the assistance information; and
transmitting, by the CU to the DU, the paging message carrying the assistance information.

8. The wireless communication method of claim 6, wherein transmitting the paging message further comprises:
transmitting, by the CU to the DU, a DU synchronization message; receiving, by the CU, a response message transmitted by the DU according to the DU synchronization message;
calculating, by the CU, a transmission latency with the DU according to the response message; and
prior to the time point of transmitting the paging message, transmitting, by the CU to the DU, the paging message according to the transmission latency.

9. A wireless communication device, comprising:
a reception module of a base station in a 5G network configured to receive, from a centralized unit (CU) of the base station, a paging message, wherein the paging message comprises assistance information that comprises a discontinuous reception (DRX) parameter and a list of cells; and
a transmission module of the base station configured to:
determine a transmission time point of the paging message according to the DRX parameter, and
transmit, to a user equipment (UE), the paging message at the transmission time point according to the assistance information.

10. The wireless communication device of claim 9, wherein the transmission module is further configured to:
determine a transmission area of the paging message according to the list of cells; and
transmit, to the UE, the paging message at the transmission area.

11. The wireless communication device of claim 9, wherein the transmission module is further configured to on a condition that the paging message is transmitted abnormally, transmit, to the CU, a paging abnormal message, wherein the paging abnormal message comprises a reason for failing to transmitting the paging message.

12. The wireless communication device of claim 11, wherein the transmission module is further configured to:
in response to determining that an abnormal event of missing a preset transmission time point occurs when transmitting the paging message, transmit, to the CU, time advance information, wherein the time advance information is to instruct the CU to adjust a time point of transmitting the paging message.

13. The wireless communication device of claim 9, wherein the paging message further comprises terminal paging record information.

14. A wireless communication node, comprising:
a generation module of a base station in a 5G network configured to generate a paging message; and
a transmission module of the base station configured to transmit, to a distributed unit (DU) of the base station, the paging message,
wherein the paging message comprises assistance information that comprises a discontinuous reception (DRX) parameter and a list of cells, and wherein the DRX parameter is configured for the DU to calculate a transmission time point for transmitting the paging message.

15. The wireless communication node of claim 14, wherein the transmission module is further configured to:
place the DRX parameter in the assistance information; and
transmit, to the DU, the paging message carrying the assistance information.

16. The wireless communication node of claim 14, wherein the transmission module is further configured to:
transmit, to the DU, a DU synchronization message;
receive a response message transmitted by the DU according to the DU synchronization message;
calculate a transmission latency with the DU according to the response message; and
prior to the time point of transmitting the paging message, transmit, to the DU, the paging message according to the transmission latency.

* * * * *